(12) United States Patent
Kyperountas et al.

(10) Patent No.: US 8,798,103 B2
(45) Date of Patent: Aug. 5, 2014

(54) METHOD AND APPARATUS FOR A MULTI-ANTENNA DEVICE THAT USES A SINGLE BASEBAND FILTER AND ANALOG-TO-DIGITAL CONVERTER

(75) Inventors: Spyros Kyperountas, Weston, FL (US); Robert E. Stengel, Pompano Beach, FL (US)

(73) Assignee: Motorola Solutions, Inc., Schaumburg, IL (US)

(*) Notice: Subject to any disclaimer, the term of this patent is extended or adjusted under 35 U.S.C. 154(b) by 301 days.

(21) Appl. No.: 13/288,212

(22) Filed: Nov. 3, 2011

(65) Prior Publication Data

US 2013/0114588 A1   May 9, 2013

(51) Int. Cl.
*H04J 3/04* (2006.01)

(52) U.S. Cl.
USPC .......................................... 370/535; 370/334

(58) Field of Classification Search
None
See application file for complete search history.

(56) References Cited

U.S. PATENT DOCUMENTS

| 6,748,203 | B1 | 6/2004 | Brankovic et al. | |
| 2003/0056221 | A1 | 3/2003 | Zhang et al. | |
| 2006/0227905 | A1* | 10/2006 | Kunysz et al. | 375/345 |
| 2008/0205542 | A1 | 8/2008 | Rofougaran | |
| 2010/0195669 | A1 | 8/2010 | Tzeng et al. | |
| 2010/0302086 | A1* | 12/2010 | Dudgeon et al. | 341/155 |

OTHER PUBLICATIONS

G. Krishnaumurthy et al; "Integrated Time Division Multiplexing Front-End Circuit for Multi-anetenna RF Receivers"—RM04D-5 IEEE Radio Frequency Integrated Circuits Symposium—2008.
U.S. Appl. No. 12/951,235, filed Nov. 22, 2010.

* cited by examiner

*Primary Examiner* — Duc C Ho
(74) *Attorney, Agent, or Firm* — Barbara R. Doutre (57) ABSTRACT

A multi-antenna device (200) comprising a set of antennas (210-214), a set of receivers (220-224), a multiplexer (270), a baseband filter (242), an analog-to-digital converter (244), and a de-multiplexer (272). The receivers (220-224) can be linked to the antennas (210-214) in a one-to-one manner. The multiplexer (270) can generate a composite analog signal from a set of different analog signals, one received from different ones of the antennas (210-214). The baseband filter (242) can filter the composite analog signal. The analog-to-digital converter (244) can convert the composite analog signal after being filtered by the baseband filter into a composite digital signal. The de-multiplexer (272) can generate a set of different digital signals from the composite digital signal. Each of the different digital signals can correspond to one of the different analog signals in a one-to-one manner.

18 Claims, 8 Drawing Sheets

METHOD AND APPARATUS FOR A MULTI-ANTENNA DEVICE THAT USES A SINGLE BASEBAND FILTER AND ANALOG-TO-DIGITAL CONVERTER

FIELD OF THE DISCLOSURE

The present disclosure relates generally to multi-antenna devices and more particularly to a multi-antenna device that uses a common signal path for analog/digital conversions for multiple ones of the antennas.

BACKGROUND

Conventional multi-antenna devices require multiple signal paths from each antenna through analog-to-digital (A/D) conversion. For example, a four antenna multiple-input and multiple-output (MIMO) device uses multiple antennas, each having a corresponding receiver/transmitter, baseband filter, and A/D converter. MIMO is just one standard applicable to multi-antenna devices, which are becoming increasingly common. Further, these multi-antenna devices are being delivered in smaller packages. Internal space within a form factor of a device having at least one antenna is now at a premium. Power consumption and manufacturing costs may also inhibit incorporation of multi-antennas in a device.

Accordingly, there is a need for a multiple antennas devices and improved signal conversion.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One embodiment of this disclosure is for a multi-antenna device, which comprises a plurality of antennas and receivers, a multiplexer, a baseband filter, an analog-to-digital converter (ADC), and a de-multiplexer. Each of the receivers can be linked to one of the antennas in a one-to-one manner. The multiplexer can generate a composite analog signal from a plurality of different analog signals. Each of the different analog signals can be received from different ones of the plurality of antennas. The baseband filter can filter the composite analog signal. The ADC can convert the composite analog signal (after being filtered by the baseband filter) into a composite digital signal. The de-multiplexer can generate a plurality of different digital signals from the composite digital signal produced by the ADC. Each of the different digital signals can correspond to one of the different analog signals in a one-to-one manner. Thus, the multi-antenna device can use a common signal path for analog-to-digital conversions, which minimizes a quantity of baseband filters and ADCs required by the device.

In one contemplated arrangement, the multiplexer can use a set of local oscillator (LO), one per each receiver. For example in one embodiment, a LO can be based on direct digital synthesis (DDS). The LOs can allow for highly flexible analog waveform generation. Thus, the LOs can allow for a combining of multiple signal paths based on frequency-division multiplexing (FDM), time-division multiplexing (TDM), code division multiplexing (CDM), and/or combinations thereof.

Figure 1:
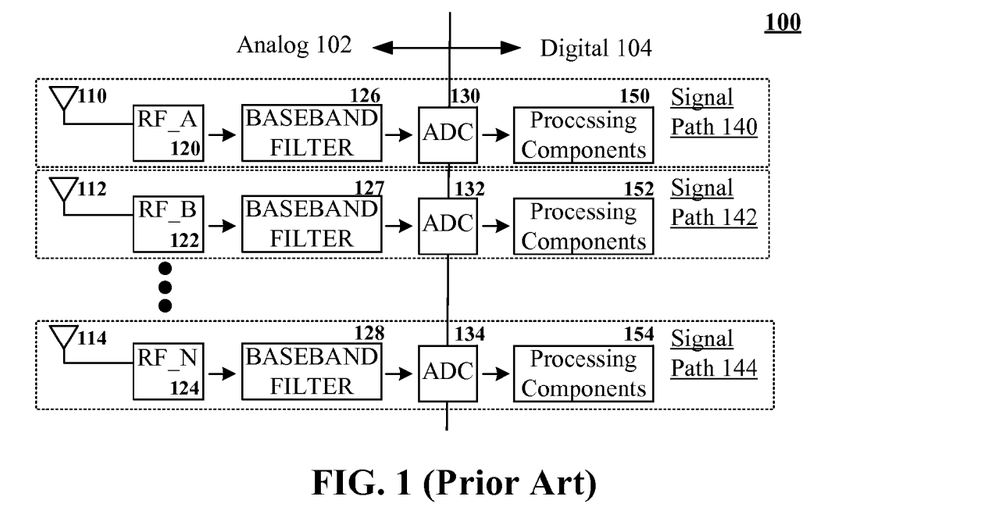
FIG. 1 (Prior Art) shows a conventional implementation of a multi-antenna device.

FIG. 1 (Prior Art) shows a conventional implementation of a multi-antenna device 100, which is illustrated as a contrast with the disclosed implementation. In FIG. 1, a set of receiving antennas 110, 112, 114 and corresponding receivers 120, 122, 124 are able to each concurrently receive radio frequency (RF) signals. Received signals are initial ones, which are each frequency shifted to match a baseband using baseband filters 126, 127, and 128. This output is then converted to a digital signal using ADC 130, 132 and 134. A digital form of each received signal is then separately processed/handled by processing components 150, 152, and 154. Throughout this processing, a discrete signal path 140, 142, and 144 across an analog 102 to digital 104 boundary is maintained. One discrete signal path 140-144 for each antenna 110-114. A discrete baseband filter 126-128 and a discrete ADC 130-134 is required by device 100 for each supported antenna 110-114. In other words, a one-to-one relationship between antenna 110-114, receivers 120-124, baseband filters 126-128, and ADC 130-134 exists. Such an arrangement is subject to the disadvantages previously discussed.

Figure 2:
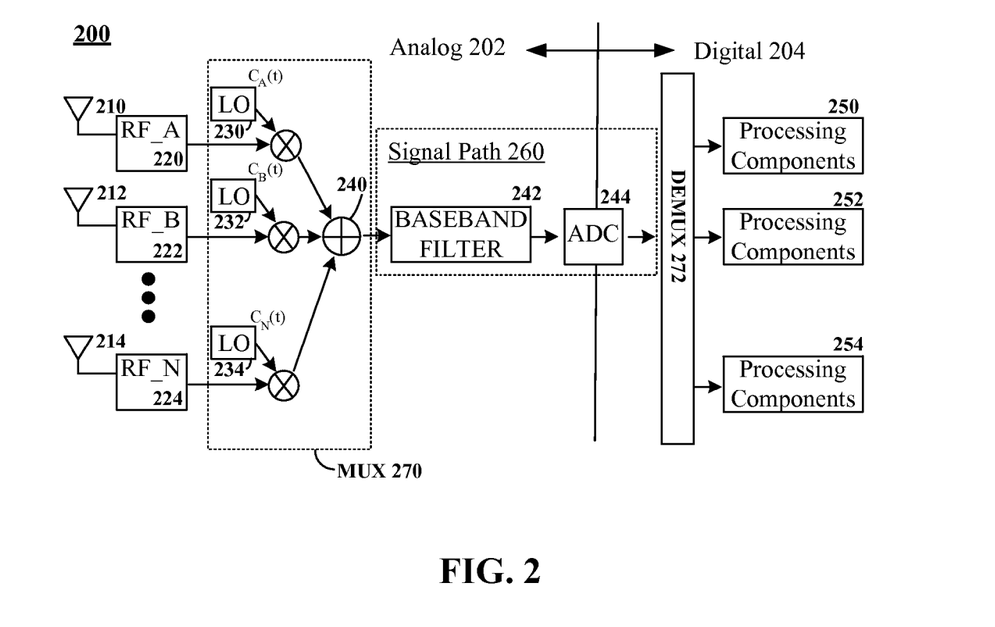
FIG. 2 shows a multi-antenna device in accordance with an embodiment of the inventive arrangements disclosure herein.

Turning to FIG. 2, a multi-antenna device 200 is shown, where a single baseband filter 242 and ADC 244 is utilized to handle multiple RF signals received from multiple antennas 210-214. In the illustrated embodiment, each antenna 210-214 is coupled to a receiver 220-224, which is in turn coupled to a local oscillator (LO) 230-234. Each LO 230-234 can generate an arbitrary signal (shown as $C_A(t)$, $C_B(t)$, and $C_N(t)$, respectively) that allow for signal separation using digital processing. The generated analog signals created by mixing $C_A(t)$, $C_B(t)$, ... $C_N(t)$ and the antenna signals, can each pass through an initial mixer, after which the signals are combined into a single composite analog signal. In one embodiment, an additive mixer 240 can combine the modified analog signals into the composite signal.

That is, the modulation of LO 230-234 permits multiple "narrowband" signals to be combined into a single "wideband" analog signal, which is referred to as a composite signal. The set of concurrently received analog signals are multiplexed (by MUX 270) into a composite signal. This combination can occur non-destructively and can occur regardless of whether the combined analog signals are similar or dissimilar to each other. Further, the combination occurs at an analog 202 processing stage without appreciable loss (or at least without significant/substantial loss) of underlying data encoded within the received signals.

The composite analog signal can be filtered via baseband filter 242, which is then converted using ADC 244. The digitally converted composite signal can be de-multiplexed (by DEMUX 272) into a set (2 ... N) of discrete digital signals, one per antenna. Each of these digital signals can be subsequently processed by digital components 250-254 of the device 200. Each of the digital signals corresponds to one of the signals received by one of the antennas 210-214.

Thus, regardless of a quantity of antennas 210-214 used by the multi-antenna device 200 (in FIG. 2, N represents an integer two or greater) a single signal path 260 exists across the analog 202 to digital 204 boundary. Stated differently, a number of needed baseband filters 242 and ADC 244 is reduced from N to 1, through use of the MUX 270 and DEMUX 272, which are implemented in a manner that is substantially transparent to any other components of device 200. That is, a direct substitution of MUX 270, DEMUX 272, and components 242 and 244 for components 126-128 and 130-134 occurs without otherwise substantially affecting functionality of device 200 and without affecting ancillary components (e.g., 210-214, 220-224, 250-254) of the device 200. The reduction of baseband filters 242 and ADCs 244 achieved for device 200 can result in advantages in manufacturing costs, performance, and/or power consumption over implementations (e.g., system 100) that have a dedicated signal path 140-144 per antenna 110-114.

It should be appreciated that embodiments are contemplated where N signals from N antennas are processed by more than one ACD 244, which is still a number less than N. For example, ten different signals received from ten different antennas can be separated into two groups of five, where each group of five is handled by a single signal path 260, baseband filter 242, and ADC 244. Hence, in that example, ten signals from ten antennas can be handled by two ACDs in accordance with specifics disclosure herein.

Figure 3:
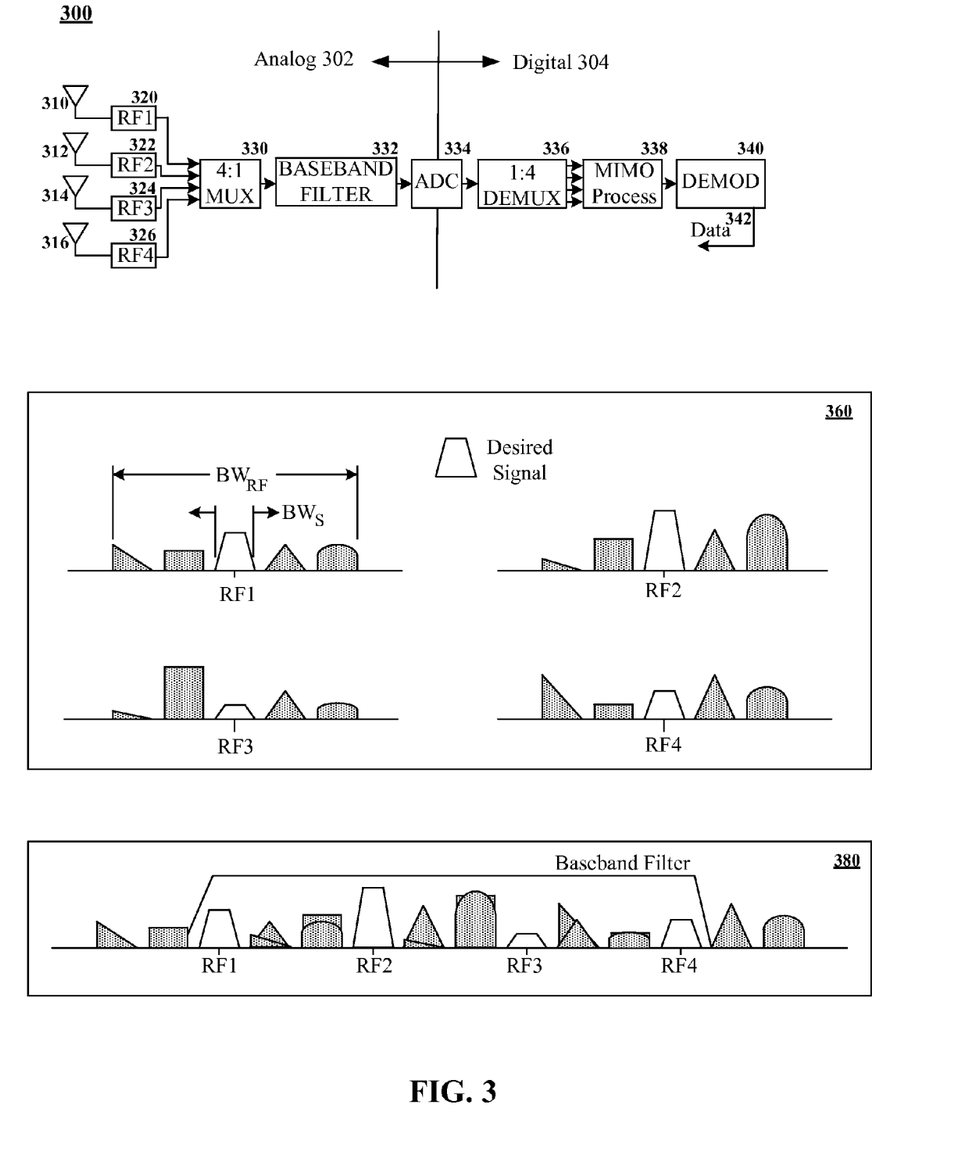
FIG. 3 shows a four antenna multiple-input and multiple-output (MIMO) device in accordance with an embodiment of the inventive arrangements disclosure herein.

FIG. 3 shows a four antenna multiple-input and multiple-output (MIMO) device 300, which utilizes a single baseband filter 330 and ADC 334 in accordance with an embodiment of the inventive arrangements disclosure herein. MIMO device 300 represents an embodiment of multi-antenna device 200, where N equals four and where the received signals are similar to each other.

Hence, four signals (RF1-RF4) can be received by four antennas 310, 312, 314, 316 coupled to four receivers 320, 322, 324, 326. Multiplexer (MUX) 330 can generate a composite analog signal from four different component analog signals. In other words, a four-to-one multiplexing function occurs on the analog 302 side and a one-to-four de-multiplexing function occurs (by DEMUX 336) in the digital side 304 side. MIMO processes 338 can then occur for the four distinct digital signals, which are produced by DEMUX 336 from the composite signal. The results of MIMO process 338 can be further processed by demodulation component 340, which products data 342.

Diagram 360 visually illustrates four different signals (RF1, RF2, RF3, and RF4), which correspond to the signals received by antennas 310-316. Each of the signals RF1-RF4 can have a reference bandwidth (BWRF) and a bandwidth signal BWS, which represents a desired signal. The signals RF1-RF4 as shown are effectively the same signal received by different antennas 310-316. The slight differences in the received signals (RF1-RF4) results from attribute modifications that occur during transmission. It should be emphasized, however, that contemplated embodiments of the disclosure are able to handle dissimilar signals, such as those coming from different sources and/or those that utilize different encoding.

Diagram 380 visually illustrates that the four signals RF1-RF4 have been combined into a single composite signal, in a non-destructive manner. As mentioned, this combining can occur using a number of techniques, which include TDM, FDM, and/or CDM. For example, in one embodiment, each LO of the MUX 330 can generate a sinusoid that will shift analog signals coming from different antenna paths in frequency. In another embodiment, the MUX 270 and/or 330 can generate orthogonal codes (instead of sinusoids) that are applied to each antenna signal. Thus, in one contemplated embodiment, the component analog signals are actually one on top of the other in the frequency domain. In still another contemplated embodiment, the MUX 270 and/or 330 can combine each analog signal in the time domain (e.g., can be given a time slot of the composite signal).

Figure 4A:
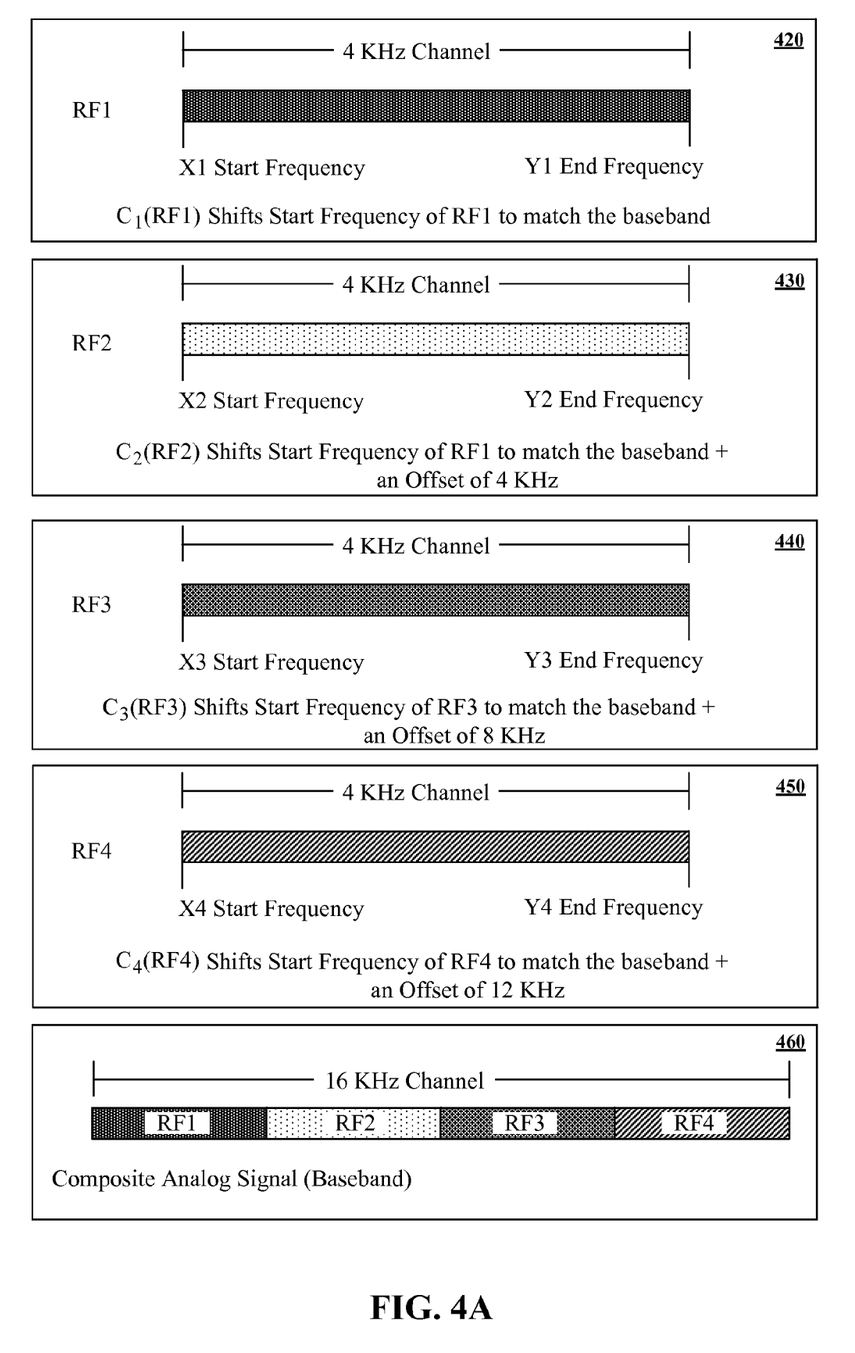
FIG. 4A illustrates a sample FDM implementation where a frequency separation is maintained between four discrete RF signals when the signals are multiplexed into a single composite signal in accordance with an embodiment of the disclosure.

To further illustrate how this combination occurs in one embodiment, FIG. 4A is presented. FIG. 4A illustrates a sample FDM implementation where a frequency separation is maintained between four discrete RF signals (RF1-RF4) 420, 430, 440, 450 when the signals 420, 430, 440, 450 are multiplexed into a single composite signal 460 in accordance with an embodiment of the disclosure.

As shown, it is assumed that each of the component signals RF1-RF4 is a 4 KHz channel. Each having an initial start frequency and end frequency, which are 4 KHz apart. A set of algorithms (C1($t$), C2($t$), C3($t$), C4($t$)) represent how the frequency range of each channel is shifted relative to the composite signal 460. For example, RF1 can be frequency shifted so that the start frequency (X1 start frequency) is at approximately the zero point of the baseband. RF2 can be frequency shifted so that the start frequency (X2 start frequency) is at zero plus an offset of 4 KHz. RF3 can be frequency shifted so that the start frequency (X3 start frequency) is at zero plus an offset of 8 KHz. RF4 can be frequency shifted so that the start frequency (X4 start frequency) is at zero plus an offset of 12 KHz. Thus, the composite signal 460 has a 16 KHz channel, with non-overlapping frequency ranges for each of the component signals (RF1-RF4).

Although 4 KHz channels are assumed for each of the component signals 420-450 in this example, the disclosure is not so limited. That is, any size channel 420-450 can be accommodated, where the different channels 420-450 need not have the same frequency range.

Further, it should be understood that creation of a composite signal 460 from the component signals 420-450 can occur in any of a variety of manners so long as the underlying data of the signals is preserved. Thus, the disclosure is not to be limited to the specific combinative technique detailed herein.

From the above, it can be seen that in a basic FDM approach, the four MIMO branches (assuming an embodiment for MIMO device 300) would be assigned to four adjacent frequency channels. Because the desired signal occupies only a small portion at the center of each frequency channel, significant channel overlap could be tolerated without disturbing the desired signal (see diagram 380, for example). Because of the overlap, the baseband filter bandwidth can be less than four times the RF bandwidth. The new baseband filter bandwidth for such an embodiment is approximately:

$$BW_{BB} = BW_S \left[ 2.5 + 1.5 \frac{BW_{RF}}{BW_S} \right]$$

In the FDM embodiment, after A/D conversion, the four MIMO branches can be digitally filtered and separated in a straight-forward manner.

Figure 4B:
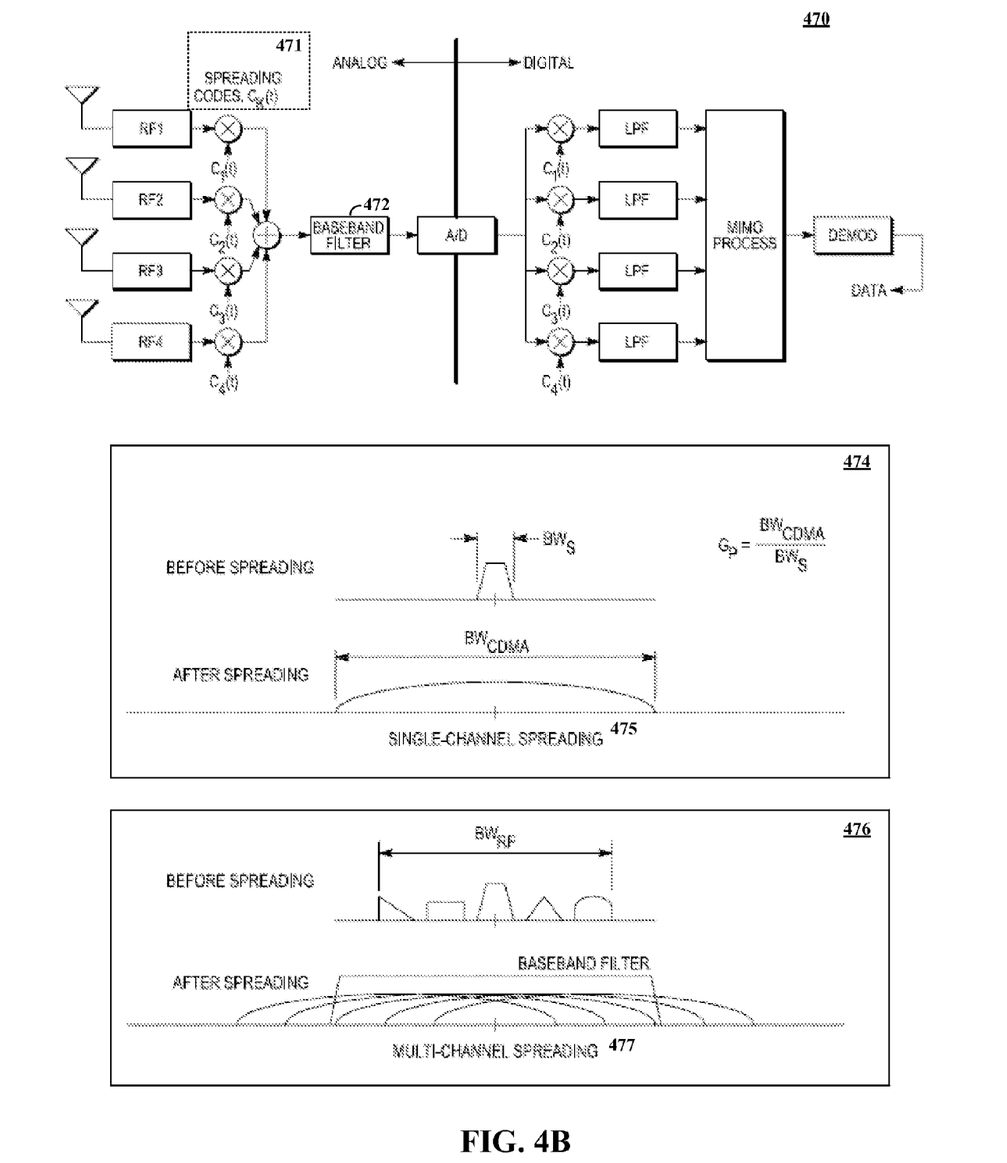
FIG. 4B shows a CDM embodiment of the disclosure.

An embodiment shown by FIG. 4B represents a CDM embodiment of the disclosure. Specifically, the multiplexing approach a multi-antenna device 470 can utilize Pseudo-noise (PN) codes, or spreading codes 471, that are able to be summed together. Frequency-domain view of the spreading operation is illustrated by diagram 474 and 476. Diagram 474 shows a signal-channel spreading 475 scenario. In FIG. 4B, processing gain, $G_P$, can be defined to be the bandwidth ratio of the spread and non-spread waveforms.

In FIG. 4B, selectivity of the RF blocks can be significantly wider than the desired signal, containing other channels or other sources of spectral energy. The spread signals from each source can spectrally overlap as shown in diagram 476, which shows a multi-channel spreading scenario 277. In FIG. 4B, although the baseband filter 472 need only be wide enough to recover the desired spread waveform, the baseband filter can capture energy from the other spread waveforms as well. The below formula can be used for the illustrated embodiment:

$$BW_{BB} = BW_S * G_P$$

The de-multiplexing process for system 470 can perform a de-spreading operation in a CDM system. In general, multiplication by c1(t) can de-spread signals (desired and off-channel) from one branch (or antenna). A narrow lowpass filter (LPF) can recover the desired signal.

Figure 4C:
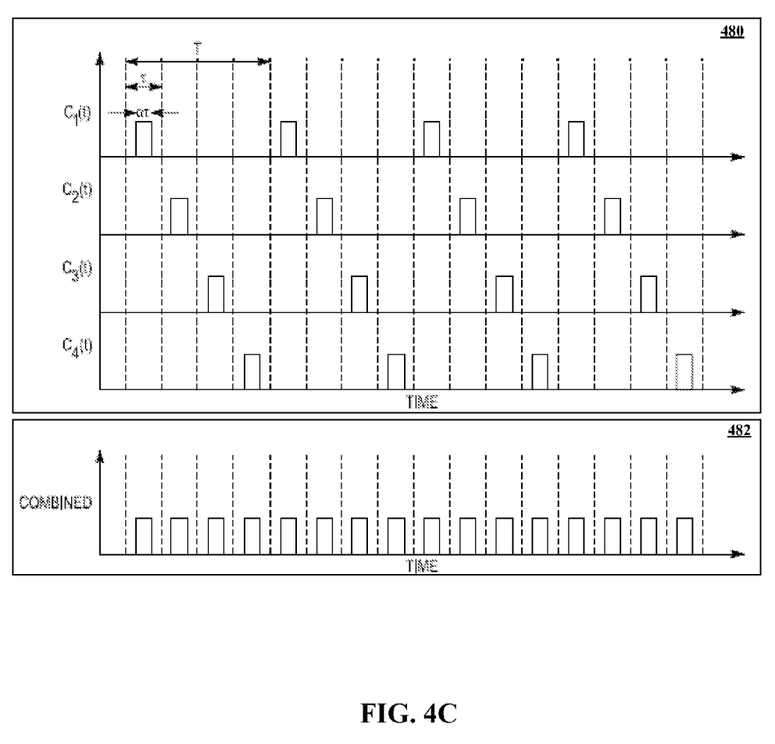
FIG. 4C shows a TDM embodiment of the disclosure.

FIG. 4C shows a TDM embodiment of the disclosure. In a TDM approach to multiplexing, spreading codes can be used to separate signals in time (e.g., gating sequences). Similar in the digital domain, the de-spreading codes can be sampling sequences followed by reconstruction filters before MIMO processing (assuming a MIMO device embodiment, such as shown in FIG. 3A). A set of gate sequences is shown by diagram 480 and 482.

Figure 5:
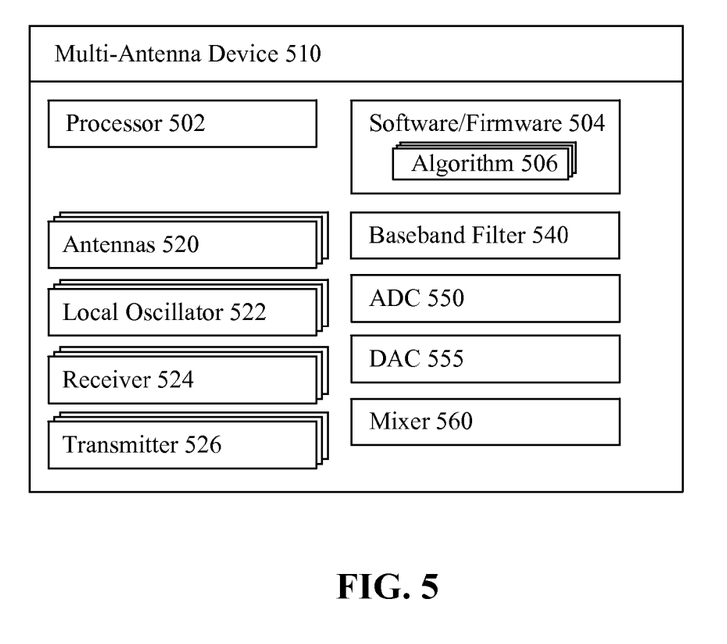
FIG. 5 is a diagram of a multi-antenna device in accordance with an embodiment of the inventive arrangements disclosed herein.

FIG. 5 is a diagram of a multi-antenna device 510 in accordance with an embodiment of the inventive arrangements disclosed herein. The device 510 can represent device 200 and/or 300, as previously detailed.

The device 510 can be any computing device or component able to transmit and/or receive radio frequency signals as detailed herein. In various contemplated embodiments, the device 510 can be implemented as a two-way radio, a mobile telephony device, a smart-phone, a personal computer, a computing tablet, a router, a network access point (AP), a wireless network interface card (NIC), a base station, and/or the like. The device 510 can minimize the number of ADCs 550 and/or DACs 555 and baseband filters 540 needed for receiving signals only, for transmitting signals only, or for receiving and transmitting signals.

Device 510 can include (or be communicatively coupled to) one or more processors 502 which are able to execute instructions of software/firmware 504 that are stored on a storage medium. The software/firmware 504 can include a set of algorithms 506 (e.g., $C_A(t)$, $C_B(t)$ $C_N(t)$, as previously described). Device 510 can also include (or be communicatively coupled to) a set of antennas 520, local oscillators 522, and receivers 524/transmitters 526. In one embodiment, a one-to-one correspondence can exist between the antennas 520 and local oscillators 522 as well as a one-to-one correspondence between antennas 520 and receivers 524 and/or transmitters 526. Device 510 can also include a single (or a quantity greater than one, but still less than the quantity of antennas 520 in the device) baseband filter 540, ADC 550, DAC 555, and/or mixer 560.

As used herein, an antenna 520 (i.e., antenna 210, 212, 214, 310, 312, 314, 316 from other figures) can be an electronic device that is used with a transmitter 526 and/or receiver 524 (i.e., 220, 222, 224, 320, 322, 324, 326). For example, a transmitter 526 can be coupled to terminals of an antenna to convert current to RF waves. Similarly, a receiver 524 can be coupled to terminals of the antenna 520 to convert RF waves to current.

A local oscillator 522 (i.e., LO 230, 232, 234) is an electronic device used to alter properties/characteristics of a received signal to facilitate a multiplexing of the signal. In one embodiment, the LO 522 can use direct digital synthesis that allows highly flexible waveform generation and allows for TDMA/FDMA/CDMA combining of multiple RF paths. The LO 522 can be capable of generating complicated signals and not just sinusoids that shift frequency coming from the different antenna paths (which is one of many contemplated embodiments).

In one embodiment (a FDMA based one), the LO 522 can convert a signal of interest to a different frequency. The process of converting these frequencies can be referred to as heterodyning, which produces the sum and difference frequency of the frequency of the local oscillator 522 and frequency of the input signal of interest. A local oscillator 522 typically produces two new frequencies (one representing a sum of mixed frequencies the other the difference), where the non-desired frequency is filtered out.

In one embodiment, the LO 522 can generate orthogonal codes (instead of sinusoids) that are applied to each antenna signal. Thus, the signals after being summed can actually be on top of one another in the frequency domain in various embodiments of the disclosure.

A baseband filter 540 (i.e., filter 242, 332) is an electronic device that only permits signals to pass having a frequency inside a defined interval (O, B) where B is the maximum frequency permitted. Thus, baseband filter 540 restricts signals to a specified frequency range.

An ADC 550 (i.e., ADC 244, 334) is an electric device that converts an analog signal (continuous quantity) to a discrete time digital presentation of the same. The reverse function of the ADC 550 is performed by the DAC 555.

The mixer 560 (i.e., mixer 240) can be a component able to sum a set of two or more signals. In one embodiment, mixer 560 can be an additive mixer that adds two or more component or source signals to form a composite signal, which contains the encoded information of each of the source signals.

Figure 6:
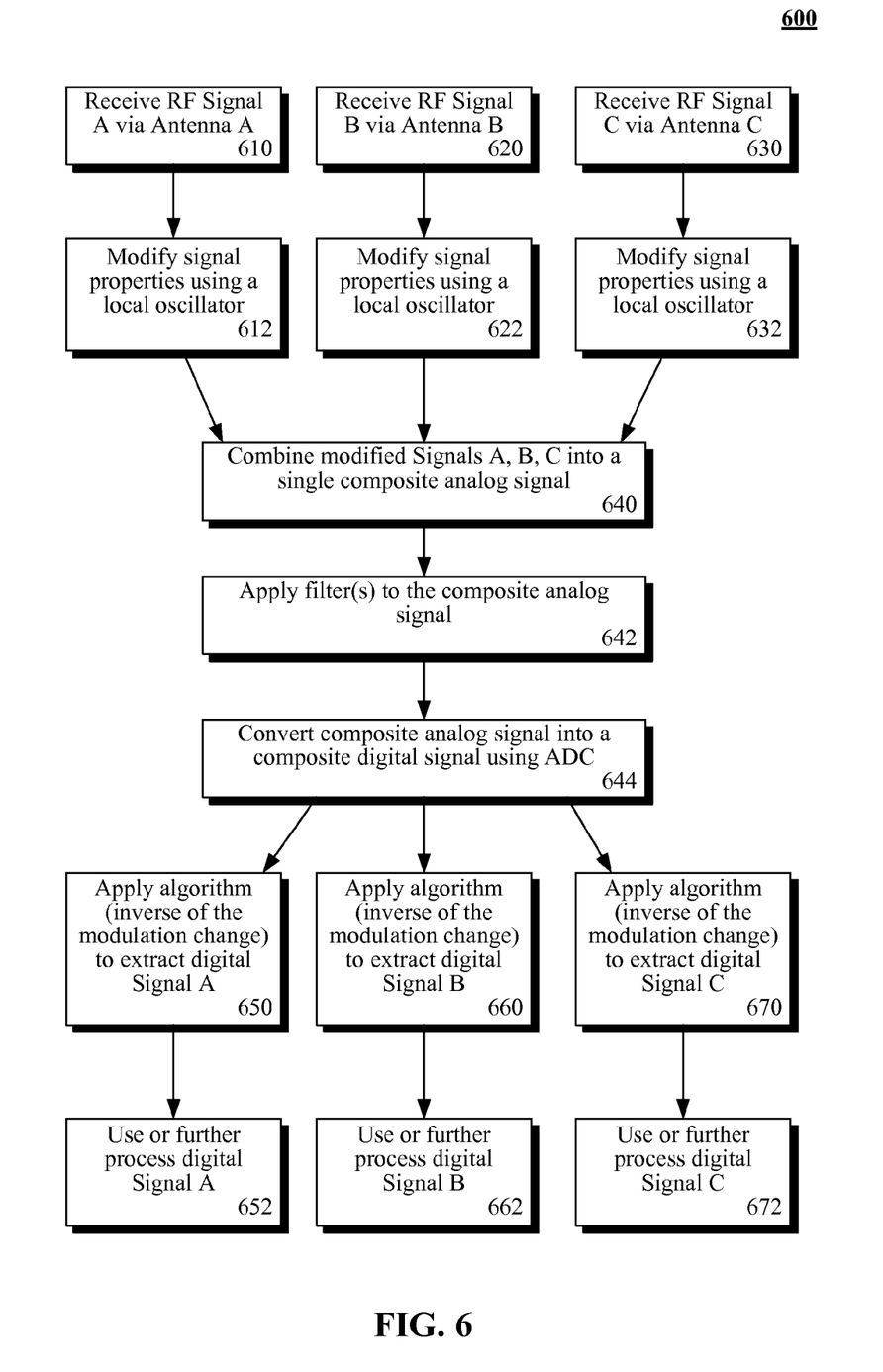
FIG. 6 shows a flowchart of a method for converting a set of received signals from multiple antennas into their digital equivalents using a minimal set of baseband filters and ADCs in accordance with an embodiment of the inventive arrangements disclosed herein.

FIG. 6 shows a flowchart of a method 600 for converting a set of received signals from multiple antennas into their digital equivalents using a minimal set of baseband filters and ADCs in accordance with an embodiment of the inventive arrangements disclosed herein.

In method 600, an RF Signal A can be received by an Antenna A in step 610, which is modified by a local oscillator in step 612, which modifies one or more signal property (e.g., frequency, time, phrase, or combinations thereof) of a received signal to facilitate a summing of these signals. In step 620, an RF Signal B can be received by Antenna B, which is modified by a local oscillator in step 622. In step 630, an RF Signal C can be received by an Antenna C, which is modified by a local oscillator in step 632. It should be appreciated that the resulting signals maintain their encoded information without substantial loss.

For example, in a FDMA embodiment, resulting frequency ranges (after modification by the local oscillators in steps 612, 622, and 632) can be ones that are non-overlapping and that have been adjusted to a baseband frequency. In another embodiment, the frequency ranges can be completely overlapping (yet use time and/or phase, for example) to ensure composite signals retains information able to be extracted into component signals without substantial information loss.

In one embodiment, steps 610, 620, and 630 can execute independently of each other and in parallel to each other.

As a practical matter, the number of antennas handled per baseband filter and ADC can be restricted based on component properties. For example, in a FDMA embodiment, the number of antennas handled per filter and/or ADC can be restricted by the frequency ranges of interest of the received signals (sum of these ranges) and by the frequency range able to be handled by the ADC and baseband filter. In such an embodiment, additional baseband filters and ADCs can be added as necessary, should the capabilities of a single ADC and/or baseband filter be exceeded.

A mixer can combine the modified source signals resulting from steps 612, 622, and 632 into a composite signal, as shown by step 640. In step 642, a baseband filter can be applied to the composite analog signal. In step 644, the composite analog signal can be converted by a single ADC into a digital representation of the composite signal, referred to as a composite digital signal.

In steps 650, 660, and 670 a set of algorithms can be applied to the composite digital signal to generate a set of digital signals, which correspond to the set of analog signals received in steps 610, 620, and 630. More specifically, in step 650, an algorithm can be applied that corresponds to the modulation (e.g., frequency range shift, a phase shift, a time shift, etc.) that was applied in step 612. In step 660, an algorithm can be applied that corresponds to the modulation that was applied in step 622. In step 670, an algorithm can be applied that corresponds to the modulation that was applied in step 632. The resulting digital signals can be further processed digitally or can be otherwise used in steps 652, 662, and 672.

In one embodiment, steps 650, 660, and 670 can be performed independent of each other and in parallel to each other.

Figure 7:
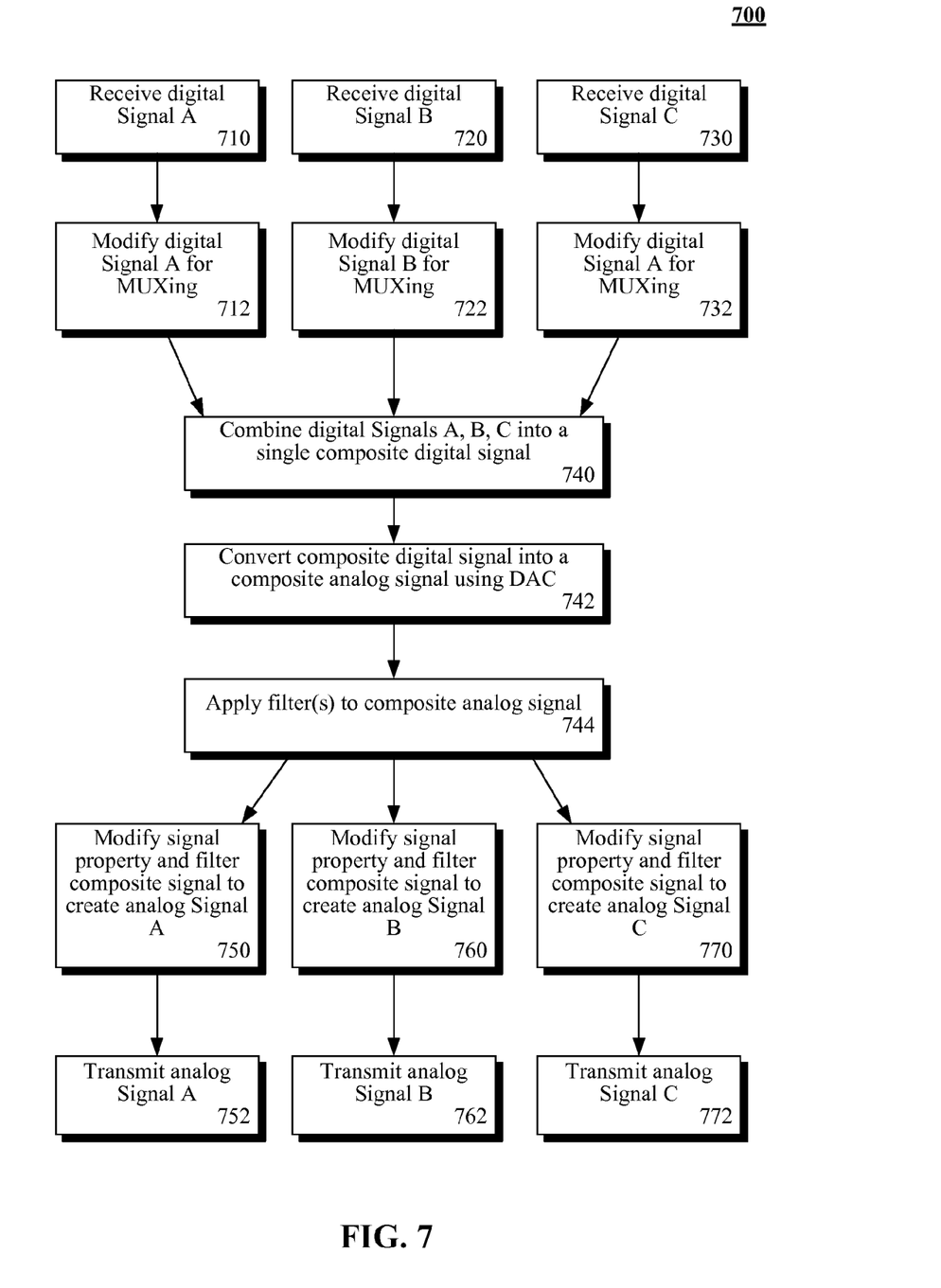
FIG. 7 shows a flowchart of a method for converting a set of digital signals into a set of RF signals for transmission using a minimal set of baseband filters and DACs in accordance with an embodiment of the inventive arrangements disclosed herein.

FIG. 7 shows a flowchart of a method 700 for converting a set of digital signals into a set of RF signals for transmission using a minimal set of baseband filters and DACs in accordance with an embodiment of the inventive arrangements disclosed herein. Method 700 illustrates that the details of the disclosure are bi-directional. That is, although receivers and received signals have been generally used as examples to illustrate the concepts expressed herein, the same techniques can also be applied to transmissions via multiple antennas.

In method 700, a digital Signal A can be received in step 710, which is modified for MUXing in step 712. The modification is one of changing a signal property (shifting a frequency range, changing phase, changing a time domain property, etc.) so that a plurality of component signals can be combined into a single composite signal. In step 720, a digital Signal B can be received, which is modified for MUXing in step 722. In step 730, a digital Signal B can be received, which is modified for MUXing in step 732.

It should be appreciated that the signal modifications can be made in a manner that ensures encoded information is preserved. For example, in a FDMA embodiment, resulting frequency ranges (after modification in steps 712, 722, and 732) can be ones that are non-overlapping and that have been adjusted to a baseband frequency. In one embodiment, steps 710, 720, and 730 can execute independently of each other and in parallel to each other.

In step 740, the digital signals A, B, and C can be combined into a Composite digital signal. In step 742, the composite digital signal can be converted into a composite analog signal using a DAC. In step 744, a baseband filter can be applied to the composite analog signal.

In steps 750, 760, and 770 the composite signal can be modified to create analog Signals A, B, and C, respectively. For example, in a FDMA embodiment, the composite signal can be frequency shifted to a bound range (one that corresponds to one of the component signals). Each of these signals can be transmitted from an antenna in steps 752, 762, and 772.

In one embodiment, steps 750, 760, and 770 can be performed independent of each other and in parallel to each other.

The arrangements of the disclosure are believed to have numerous advantages over conventional techniques for implementing equivalent functionality. These advantages include, but are not limited to: having a smaller footprint than conventional components (e.g., fewer baseband filters, ADCs, and/or DACs used), having a lower manufacturing cost, having improved performance, and/or consuming less power than functionally equivalent conventional implementations (that require a dedicated baseband filter and ADC per antenna).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A multi-antenna device comprising:
   a plurality of antennas;
   a plurality of receivers, each linked to one of the antennas in a one-to-one manner;
   a multiplexer configured to generate a composite analog signal from a plurality of different analog radio frequency (RF) signals, one received from different ones of the plurality of antennas, wherein said multiplexer comprises:
      a plurality of local oscillators, one communicatively linked to each receiver, wherein each of the local oscillators generates an output analog signal, wherein the local oscillators, the receivers, and the antennas receive or process analog signals in parallel with and independent of each other; and
      a mixer for combining the output analog signals of the local oscillators to generate the composite analog signal;
   a baseband filter for filtering the composite analog signal;
   an analog to digital converter for converting the previously filtered composite analog signal after being filtered by the baseband filter into a composite digital signal; and
   a de-multiplexer configured to generate a plurality of different digital signals from the composite digital signal produced by the analog to digital converter, wherein each of the different digital signals corresponds to one of the different analog RF signals in a one-to-one manner.

2. The multi-antenna device of claim 1, wherein the local oscillators, the receivers, and the antennas receive or process analog signals in parallel with and independent of each other.

3. The multi-antenna device of claim 1, wherein the multi-antenna device is a multiple-input and multiple-output (MIMO) device, wherein each of the antennas is a multiple-input and multiple-output (MIMO) antenna.

4. The multi-antenna device of claim 1, wherein the analog RF signals received by each of the antennas are dissimilar signals that come from different sources and that utilize different encoding from each other.

5. The multi-antenna device of claim 1, further comprising:
   a plurality of transmitters, each linked to one of the antennas in a one-to-one manner; and
   a digital-to-analog converter for converting the composite digital signal, into an outgoing composite analog signal, which is converted into a plurality of different analog signals, each of which is transmitted by one of the antennas.

6. The multi-antenna device of claim 1, wherein the multiplexer is a time-division multiplexing (TDM) or a code division multiplexing (CDM) multiplexer for modifying a signal property a plurality of received analog RF signals using a set of spreading codes to adjust the analog RF signals in either the time or phase domain.

7. The multi-antenna device of claim 1, wherein the multiplexer, the baseband filter, the analog-to-digital converter, and the de-multiplexer are direct component-wise replacements that are functionally compatible with a different set of components for handling the analog RF signals received from the antennas, where the different set of components comprise a plurality of different baseband filters and a plurality of different analog-to-digital converters, one of each for each of the different antennas.

8. A multi-antenna device comprising:
a plurality of antennas;
a plurality of receivers, each linked to one of the antennas in a one-to-one manner;
a multiplexer configured to generate a composite analog signal from a plurality of different analog radio frequency (RF) signals, one received from different ones of the plurality of antennas;
a baseband filter for filtering the composite analog signal;
an analog to digital converter for converting the previously filtered composite analog signal after being filtered by the baseband filter into a composite digital signal; and
a de-multiplexer configured to generate a plurality of different digital signals from the composite digital signal produced by the analog to digital converter, wherein each of the different digital signals corresponds to one of the different analog RF signals in a one-to-one manner; and
wherein the multiplexer is for modifying a plurality of received analog RF signals from the receivers to frequency shift each of the analog RF signals to a different frequency range that is referenced against a baseband, wherein a frequency range of the composite analog signal generated by the multiplexer has a frequency range approximately equal to a sum of the frequency ranges of the plurality of different analog RF signals.

9. A method comprising:
receiving a plurality of analog radio frequency (RF) signals from a plurality of different antennas of a multi-antenna device;
converting the received analog RF signals into a composite analog signal;
processing the composite analog signal through a baseband filter and an analog-to-digital converter to generate a composite digital signal;
generating a plurality of digital signals from the composite digital signal, wherein each of the generated digital signals corresponds to one of the received analog RF signals; and
wherein the composite analog signal and the composite digital signal are incoming signals to be processed by the multi-antenna device, wherein the method further comprises:
receiving a plurality of different outgoing digital signals to be concurrently transmitted from the multi-antenna device;
combining the different digital signals into an outgoing composite digital signal;
converting the outgoing composite digital signal into an outgoing composite analog digital signal via a digital-to-analog converter;
filtering results from the digital-to-analog converter through a baseband filter;
generating a plurality of outgoing analog signals from the composite analog signal, wherein each of the generated analog signals corresponds to one of the different outgoing analog signals; and
transmitting the outgoing analog signals using the plurality of different antennas, one outgoing analog signal per one of the different antennas.

10. The method of claim 9, wherein the multi-antenna device is a multiple-input and multiple-output (MIMO) device, wherein each of the antennas is a multiple-input and multiple-output (MIMO) antenna.

11. The method of claim 9, wherein the analog RF signals received by the different antennas are dissimilar signals that come from different sources and that utilize different encoding from each other.

12. The method of claim 9, wherein the analog RF signals received by the different antennas have different frequency ranges from each other, and wherein the converting converts the received analog RF signals into the composite analog signal having a frequency range approximately equal to a sum of the frequency ranges of the plurality of analog RF signals.

13. A method comprising:
receiving a plurality of analog radio frequency (RF) signals from a plurality of different antennas of a multi-antenna device;
converting the received analog RF signals into a composite analog signal;
processing the composite analog signal through a baseband filter and an analog-to-digital converter to generate a composite digital signal;
generating a plurality of digital signals from the composite digital signal, wherein each of the generated digital signals corresponds to one of the received analog RF signals; and
modifying each of the received analog RF signals using a plurality of local oscillators to generate a plurality of modified analog signals having a different frequency range than the received analog RF signals, wherein the modified analog signals are referenced against a common baseband and have non-overlapping ranges from each other, wherein the composite analog signal is created from the modified analog signals.

14. A method comprising:
receiving a plurality of analog radio frequency (RF) signals from a plurality of different antennas of a multi-antenna device;
converting the received analog RF signals into a composite analog signal,
processing the composite analog signal through a baseband filter and an analog-to-digital converter to generate a composite digital signal;
generating a plurality of digital signals from the composite digital signal, wherein each of the generated digital signals corresponds to one of the received analog RF signals; and
wherein the converting modifies a frequency range of each of the analog RF signals by a signal specific offset referenced against a baseband, wherein the method further comprises:
executing a set of algorithms, one execution to generate each of the plurality digital signals from the composite digital signal, wherein each of the algorithms subtracts an offset quantity from values in a composite digital signal from a range of the composite digital signal, where the range of the composite digital signal corresponds to a range associated with and unique to a specific one of the analog RF signals, wherein the offset quantity corresponds to a frequency offset associated with and unique to a signal specific offset of one of the analog RF signals.

15. A method for converting signals from analog to digital in a multi-antenna device comprising:
receiving at a first antenna and a first receiver of a device a first analog signal;
modifying the first analog signal using a first local oscillator to generate a first modified analog signal having a first frequency range referenced against a baseband, wherein the modifying results in a first frequency shift by a first offset quantity;

receiving at a second antenna and a second receiver of the device a second analog signal;

modifying the second analog signal using a second local oscillator to generate a second modified analog signal having a second frequency range referenced against the baseband, wherein the modifying results in a second frequency shift by a second offset quantity;

forming a composite analog signal from the first modified analog signal and the second modified analog signal, where the composite analog signal has a frequency range greater than either the first frequency range or the second frequency range;

processing the composite analog signal through a single baseband filter;

processing the filtered composite analog signal through a single analog to digital converter to generate a composite digital signal;

executing an algorithm that produces a first digital signal by subtracting the first offset quantity from values in the first frequency range of the composite digital signal, wherein the first digital signal represents a converted form of the first analog signal; and executing an algorithm that produces a second digital signal by subtracting the second offset quantity from values in the second frequency range of the composite digital signal, wherein the second digital signal represents a converted form of the second analog signal;

wherein a single baseband filtering operation and a single analog-to-digital conversion operation is performed to produce the first digital signal and the second digital signal given the first analog signal and the second analog signal.

16. The method of claim 15, wherein the receiving and modifying of the first analog signal and the receiving and modifying of the second analog signal occurs approximately concurrently and occurs independent of the other.

17. The method of claim 15, wherein a frequency range of the composite analog signal is approximately equal to a sum of the frequency ranges of the first and second analog signals.

18. The method of claim 15, wherein the multi-antenna device comprises:
- a plurality of antennas, which includes the first antenna and the second antenna;
- a plurality of receivers, each linked to one of the antennas in a one-to-one manner, wherein said receivers comprise the first receiver and the second receiver;
- a multiplexer configured to generate the composite analog signal; and
- a de-multiplexer configured to generate the first digital signal and the second digital signal from the composite digital signal.

* * * * *

UNITED STATES PATENT AND TRADEMARK OFFICE
CERTIFICATE OF CORRECTION

PATENT NO. : 8,798,103 B2
APPLICATION NO. : 13/288212
DATED : August 5, 2014
INVENTOR(S) : Spyros Kyperountas et al.

It is certified that error appears in the above-identified patent and that said Letters Patent is hereby corrected as shown below:

IN THE TITLE PAGE:

In Item (56), under "OTHER PUBLICATIONS," in Column 2, Line 1, delete "G. Krishnaumurthy et al;" and insert -- G. Krishnamurthy et al.; --, therefor.

In Item (56), under "OTHER PUBLICATIONS," in Column 2, line 2, delete "Multi-anetenna" and insert -- Multi-antenna --, therefor.

IN THE SPECIFICATION:

In Column 3, Line 49, delete "ACD" and insert -- ADC --, therefor.

In Column 3, Line 54, delete "ACDs" and insert -- ADCs --, therefor.

In Column 5, Line 45, delete "c1(t)" and insert -- C1(t) --, therefor.

Signed and Sealed this
Nineteenth Day of July, 2016

Michelle K. Lee
*Director of the United States Patent and Trademark Office*